US009746317B2

(12) United States Patent
Chen et al.

(10) Patent No.: US 9,746,317 B2
(45) Date of Patent: Aug. 29, 2017

(54) IMAGE PROCESSING METHOD AND DEVICE

(71) Applicants: Beijing Lenovo Software Ltd., Beijing (CN); Lenovo (Beijing) Co., Ltd., Beijing (CN)

(72) Inventors: Ke Chen, Beijing (CN); Manjun Xiao, Beijing (CN); Chen Yang, Beijing (CN); Rongyao Fu, Beijing (CN); Qian Ma, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 743 days.

(21) Appl. No.: 14/229,920

(22) Filed: Mar. 30, 2014

(65) Prior Publication Data

US 2015/0092049 A1    Apr. 2, 2015

(30) Foreign Application Priority Data

Sep. 30, 2013    (CN) .......................... 2013 1 0462302

(51) Int. Cl.
*H04N 7/18*    (2006.01)
*G01B 11/25*    (2006.01)

(52) U.S. Cl.
CPC .................................... G01B 11/25 (2013.01)

(58) Field of Classification Search
CPC ........ G06F 3/017; G06F 3/011; G06F 3/0304; G06F 3/013; G06F 3/005; G06F 3/012
(Continued)

(56) References Cited

U.S. PATENT DOCUMENTS 6,125,197 A * 9/2000 Mack .................... G06T 7/0057
256/12
6,549,288 B1 * 4/2003 Migdal .................. G01B 11/25
356/601

(Continued)

FOREIGN PATENT DOCUMENTS

| CN | 1632451 A | 6/2005 |
| CN | 102073050 A | 5/2011 |
| CN | 103322937 A | 9/2013 |

OTHER PUBLICATIONS

First Chinese Office Action regarding Application No. 201310462302.6 dated Mar. 28, 2016. English translation provided by Unitalen Attorneys at Law.

*Primary Examiner* — Gims Philippe
(74) *Attorney, Agent, or Firm* — Harness, Dickey & Pierce, P.L.C.

(57) ABSTRACT

Image processing method and device are provided. The method includes: controlling a projector to project multi-stripe structured light and dot structured light onto an object, to form multiple light stripes and light spots between the light stripes on the surface of the object; acquiring a target image of the object having the light stripes and the light spots on the surface; obtaining a reference image including the light stripes and the light spots; calculating a first depth value at each light stripe in the target image based on feature information of the light stripes in the reference image and target image; calculating a second depth value at each light spot in the target image based on feature information of the light spots in the reference image and target image; and generating a depth image of the target image based on the first depth value and the second depth value.

14 Claims, 4 Drawing Sheets

(58) Field of Classification Search
USPC ............ 348/136; 345/582; 256/12; 356/625; 382/117
See application file for complete search history.

(56) References Cited

U.S. PATENT DOCUMENTS

| | | | |
|---|---|---|---|
| 7,440,590 B1* | 10/2008 | Hassebrook | G01B 11/2513 345/582 |
| 8,649,025 B2* | 2/2014 | Teodorescu | G01B 11/2509 356/625 |
| 9,294,758 B2* | 3/2016 | Xiong | H04N 13/0271 |
| 2010/0061601 A1* | 3/2010 | Abramoff | G06K 9/00617 382/117 |
| 2011/0317878 A1 | 12/2011 | Kang et al. | |
| 2013/0293700 A1 | 11/2013 | Yang | |

* cited by examiner

IMAGE PROCESSING METHOD AND DEVICE

The present application claims the priority to Chinese Patent Application No. 201310462302.6, entitled "IMAGE PROCESSING METHOD AND DEVICE", filed on Sep. 30, 2013 with the Chinese State Intellectual Property Office, which is incorporated herein by reference in its entirety.

FIELD

The disclosure relates to the field of image processing, and particularly to an image processing method and an image processing device.

BACKGROUND

Conventionally, depth camera devices based on structured light have been widely used, and depth images of scene may be obtained using such depth camera devices.

The depth camera device based on the structured light generally includes a light projector and a camera. The process for obtaining the depth image generally includes: projecting controllable structured light onto a surface of an object to be captured by the light projector to form a feature point; capturing an image of the object including feature of the structured light by the camera to capture the feature of the structured light in the image; and obtaining the depth image corresponding to the image. Currently, line structured light is usually used to obtain the depth image for real time performance. That is, multiple light stripes are presented on the object to be captured by projecting stripe-shaped structured light onto the surface of the objected to be captured, and the depth image of the image is obtained based on feature of the presented light stripes. However, although the existing way to obtain the depth image can satisfy the real time requirement, a low precision results in a low resolution of the obtained depth image.

SUMMARY

In view of the above, the disclosure provides an image processing method and an image processing device, for improving resolution of the generated depth image.

For the above object, the disclosure provides the following technical solutions.

An image processing method is provided, which is applied to an electronic device. The electronic device includes at least an image sensor and a light projector. The image processing method includes:

controlling the light projector to project multi-stripe structured light and dot structured light onto a surface of an object to be captured, to form multiple light stripes and multiple light spots between the light stripes on the surface of the object to be captured;

acquiring, by the image sensor, a target image of the object to be captured having the light stripes and the light spots on the surface;

obtaining a reference image including the light stripes and the light spots;

calculating a first depth value at each of the light stripes in the target image based on feature information of the light stripes in the reference image and feature information of the light stripes in the target image;

calculating a second depth value at each of the light spots in the target image based on feature information of the light spots in the reference image and feature information of the light spots in the target image; and generating a depth image of the target image based on the first depth value at the light stripe and the second depth value at the light spot in the target image.

Preferably, the calculating a first depth value at each of the light stripes in the target image includes:

calculating the first depth value at a stripe center of each of the light stripes in the target image.

Preferably, the calculating a first depth value at each of the light stripes in the target image based on feature information of the light stripes in the reference image and feature information of the light stripes in the target image includes:

matching the light stripes in the target image with the light stripes in the reference image, to obtain multiple stripe match pairs, wherein each of the stripe match pairs includes a target light stripe in the target image and a reference light stripe in the reference image;

calculating a first parallax of the target light stripe with respect to the reference light stripe for each of the stripe match pairs based on feature information of the target light stripe and the reference light stripe in the stripe match pair; and calculating the first depth value at the target light stripe in the target image based on the first parallax.

Preferably, the calculating a second depth value at each of the light spots in the target image based on feature information of the light spots in the reference image and feature information of the light spots in the target image includes:

matching the light spots in the target image with the light spots in the reference image, to obtain multiple light spot match pairs, wherein each of the light spot match pairs includes a first light spot in the target image and a second light spot in the reference image;

calculating a second parallax of the first light spot with respect to the second light spot for each of the light spot match pairs based on feature information of the first light spot and the second light spot in the light spot match pair; and calculating the second depth value at the first light spot in the target image based on the second parallax.

Preferably, the matching the light spots in the target image with the light spots in the reference image includes:

determining, in the reference image, a first reference light stripe and a second reference light stripe respectively matching with a first target light stripe and a second target light stripe which are any two adjacent target light stripes in the target image; and matching a target light spot between the first target light stripe and the second target light stripe in the target image with a reference light spot from light spots between the first reference light stripe and the second reference light stripe in the reference image, to obtain the light spot match pair.

The disclosure further provides an image processing device, which is applied to an electronic device. The electronic device includes at least an image sensor and a light projector. The image processing device includes:

a projection control unit, configured to control the light projector to project multi-stripe structured light and dot structured light onto a surface of an object to be captured, to form multiple light stripes and multiple light spots between the light stripes on the surface of the object to be captured;

a capturing control unit, configured to acquire, by the image sensor, a target image of the object to be captured having the light stripes and the light spots on the surface;

an obtaining unit, configured to obtain a reference image including the light stripes and the light spots;

a first depth calculation unit, configured to calculate a first depth value at each of the light stripes in the target image based on feature information of the light stripes in the reference image and feature information of the light stripes in the target image;

a second depth calculation unit, configured to calculate a second depth value at each of the light spots in the target image based on feature information of the light spots in the reference image and feature information of the light spots in the target image; and a depth image generating unit, configured to generate a depth image of the target image based on the first depth value at the light stripe and the second depth value at the light spot in the target image.

Preferably, the first depth calculation unit includes:

a center depth calculation unit, configured to calculate the first depth value at a stripe center of each of the light stripes in the target image based on the feature information of the light stripes in the reference image and the feature information of the light stripes in the target image.

Preferably, the first depth calculation unit includes:

a first matching unit, configured to match the light stripes in the target image with the light stripes in the reference image, to obtain multiple stripe match pairs, wherein each of the stripe match pairs includes a target light stripe in the target image and a reference light stripe in the reference image;

a first parallax calculation unit, configured to calculate a first parallax of the target light stripe with respect to the reference light stripe for each of the stripe match pairs based on feature information of the target light stripe and the reference light stripe in the stripe match pair; and a first depth calculation subunit, configured to calculate the first depth value at the target light stripe in the target image based on the first parallax.

Preferably, the second depth calculation unit includes:

a second matching unit, configured to match the light spots in the target image with the light spots in the reference image, to obtain multiple light spot match pairs, wherein each of the light spot match pairs includes a first light spot in the target image and a second light spot in the reference image;

a second parallax calculation unit, configured to calculate a second parallax of the first light spot with respect to the second light spot for each of the light spot match pairs based on feature information of the first light spot and the second light spot in the light spot match pair; and a second depth calculation subunit, configured to calculate the second depth value at the first light spot in the target image based on the second parallax.

Preferably, the second matching unit includes:

a stripe match determining unit, configured to determine, in the reference image, a first reference light stripe and a second reference light stripe respectively matching with a first target light stripe and a second target light stripe which are any two adjacent target light stripes in the target image; and a second matching subunit, configured to match a target light spot between the first target light stripe and the second target light stripe in the target image with a reference light spot from light spots between the first reference light stripe and the second reference light stripe in the reference image, to obtain the light spot match pair.

It can be known from the technical solution described above that, in conducting the depth analysis, multiple light stripes and light spots between the light stripes are projected onto a surface of an object to be captured by a light projector, and a target image of the object to be captured including the multiple light stripes and light spots is then captured, so that the target image includes more information about structured light, which increases positions in the target image for calculating the depth values. Furthermore, after the target image is obtained, a first depth value at each light stripe in the target image and a second depth value at each light spot in the target image are calculated in conjunction with feature information of the light stripes and the light spots in a reference image, and a depth image of the target image is generated based on the obtained first depth value and second depth value. Compared with the conventional technology that the depth image is generated based on light stripes in the image, multiple light spots are inserted between the light stripes and both the depth value at the light stripe in the target image and the depth value at the light spot between the light stripes in the target image are used to generate the depth image in the embodiment of the disclosure, therefore, the generated depth image has higher resolution.

BRIEF DESCRIPTION

In order to more clearly illustrate the technical solution in the embodiments of the disclosure or in the prior art, accompanying drawings used in the description of the embodiments or the prior art will be introduced simply below. Obviously, the accompanying drawings in the following description are merely some embodiments of the disclosure. For those skilled in the art, other drawings may be obtained based on these accompanying drawings without any creative work.

DETAILED DESCRIPTION

In the following, the technical solution in the embodiments of the disclosure will be described clearly and completely in conjunction with the accompanying drawings in the embodiments of the disclosure. Obviously, the described embodiments are merely part of embodiments of the disclosure. All other embodiments obtained by those skilled in the art based on the embodiments of the disclosure without any creative work fall within the scope of protection of the disclosure.

An image processing method is provided according to an embodiment of the disclosure, for obtaining a depth image having higher resolution with small calculation amount.

Figure 1:
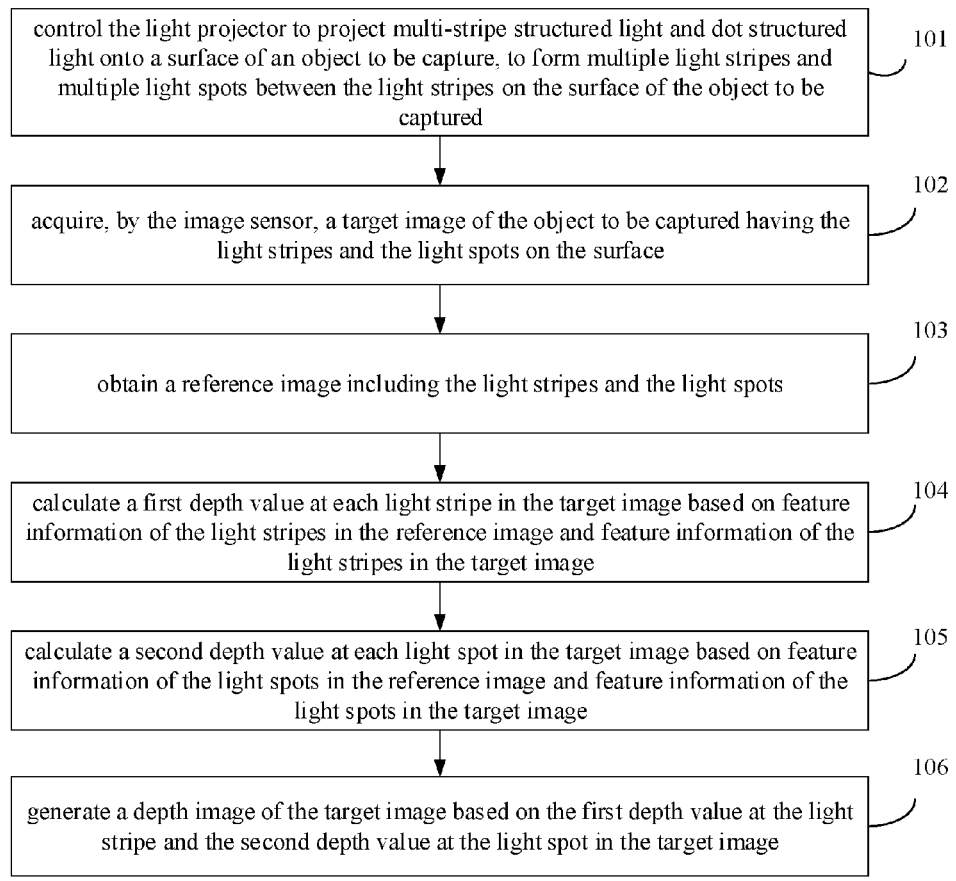
FIG. 1 illustrates a schematic flow chart of an image processing method according to an embodiment of the disclosure.

Reference is made to FIG. 1 which is a schematic flow chart of an image processing method according to an embodiment of the disclosure. The image processing method of the embodiment is applied to an electronic device, and the electronic device includes at least an image sensor and a light projector. For example, the electronic device may be a depth camera based on structured light, or may be other electronic device having a camera and a structured light transmitter. The image processing method of the embodiment includes the following steps 101-106.

Step 101 is controlling the light projector to project multi-stripe structured light and dot structured light onto a surface of an object to be captured, to form multiple light stripes and multiple light spots between the light stripes on the surface of the object to be captured.

The light projector may also be called as a light transmitter, which can transmit structured light and project the structured light onto the object to be measured, so that a corresponding structured light pattern are projected on the object to be measured. For example, the light projector may project line structured light, dot structured light or plane structured light. The object to be measured is an object on which the depth analysis needs to be performed. In order to perform the depth analysis on an image of the object, an image of the object to be measured needs to be obtained later. Therefore, the object to be measured is referred to as an object to be captured in the embodiment.

In the embodiment of the present application, the stripe structured light and the dot structured light are projected onto the surface of the object to be captured by the light projector, so there are multiple light stripes and light spots between any two of the light stripes on the surface of the object to be captured. In order to form light stripes on the surface of the object to be captured, a light beam emitted from the light projector forms a narrow light plane in space, and a bright light stripe is generated on the surface of the object to be captured when the light plane intersects with the surface of the object to be captured.

The implementation process of projecting multiple light stripes and light spots between the light stripes onto the surface of the object to be captured by the light projector is similar to the conventional process of controlling the light projector to project a specified pattern onto the surface of the object to be captured. For example, a grating imaging method may be used, projection lens of the light projector is provided with a grating having a specified pattern, and a light feature pattern having the specified pattern is formed on the surface of the object to be captured after the light projector is controlled to project laser. For another example, a space encoding method may be used, a rule for generating multi-stripe structured light and dot structured light is preset, and the light projector is controlled to transmit light in accordance with the rule, so as to project multiple light stripes and light spots between the light stripes onto the surface of the object to be captured.

It may be understood that the object to be captured may be one subject, or two or more subjects within a specified area, or an object including multiple subjects and background within a specified area.

Step 102 is acquiring, by the image sensor, a target image of the object to be captured having the light stripes and the light spots on the surface.

After the light stripes and the light spots are projected onto the surface of the object to be captured by the light projector, the object to be captured is captured by the image sensor, and the obtained target image includes the object and the light stripes and the light spots on the surface of the object.

Step 103 is obtaining a reference image including the light stripes and the light spots.

Depth information can not be obtained from a two-dimensional image captured by a common camera. Depth analysis based on the structured light is to determine the depth information of the captured image by a three-dimensional measurement based on the structured light.

In practical, the object to be captured is generally a three-dimensional object but not a two-dimensional object. Thus, after the structured light is projected onto the object to be captured by the light projector, the projected structured light may be adjusted due to a change in the depth on the surface of the object to be captured and possible gaps when the projected structured light intersects with the object to be captured, so distortion occurs in the structured light presented on the object to be captured. For example, the adjusted stripe structured light presented on the surface of the object to be captured may be shifted or discontinuous.

In conducting the depth analysis, three-dimensional information of the surface of the object to be captured may be obtained based on the distorted structured light on the surface of the object to be captured, and the depth values at respective positions on the surface of the object to be captured are obtained. In order to determine the distortion of the structured light in the image of the object to be captured, the reference image needs to be obtained, so as to determine the distortion degree of the structured light on the object to be captured based on information of structured light in the reference image.

The reference image, which includes information of the stripe structured light and the dot structured light projected by the light projector, is obtained in advance for analyzing the distortion degree of the light stripes and the light spots in the target image. That is, the stripe structured light and the dot structured light projected by the light projector in generating the reference image are the same as the stripe structured light and the dot structured light projected by the light projector in generating the target image. Specifically, the number of the stripe structured light and the number of the dot structured light projected by the light projector in generating the reference image are the same as the number of the stripe structured light and the number of the dot structured light projected by the light projector in generating the target image, and the arrangement of the dot structured light between any two of the stripe structured light in generating the reference image is the same as the arrangement of the dot structured light between any two of the stripe structured light in generating the target image. However, the information of the structured light included in the reference image is information of the structured light without distortion, that is, the light stripes and the light spots included in the reference image are not distorted, while the light stripes and the light spots in the target image are distorted.

The method for obtaining the reference image is a conventional method. For example, the light projector may project the stripe structured light and the dot structured light onto a plane parallel to the projection plane of the light projector, multiple light stripes and light spots are formed on the plane, and the reference image may be obtained by capturing an image of the plane including the multiple light stripes and the light spots. Because the depth of each point in the plane is the same, the stripe structured light and the dot structured light are not distorted after the stripe structured light and the dot structured light intersect with the plane.

Figure 2:
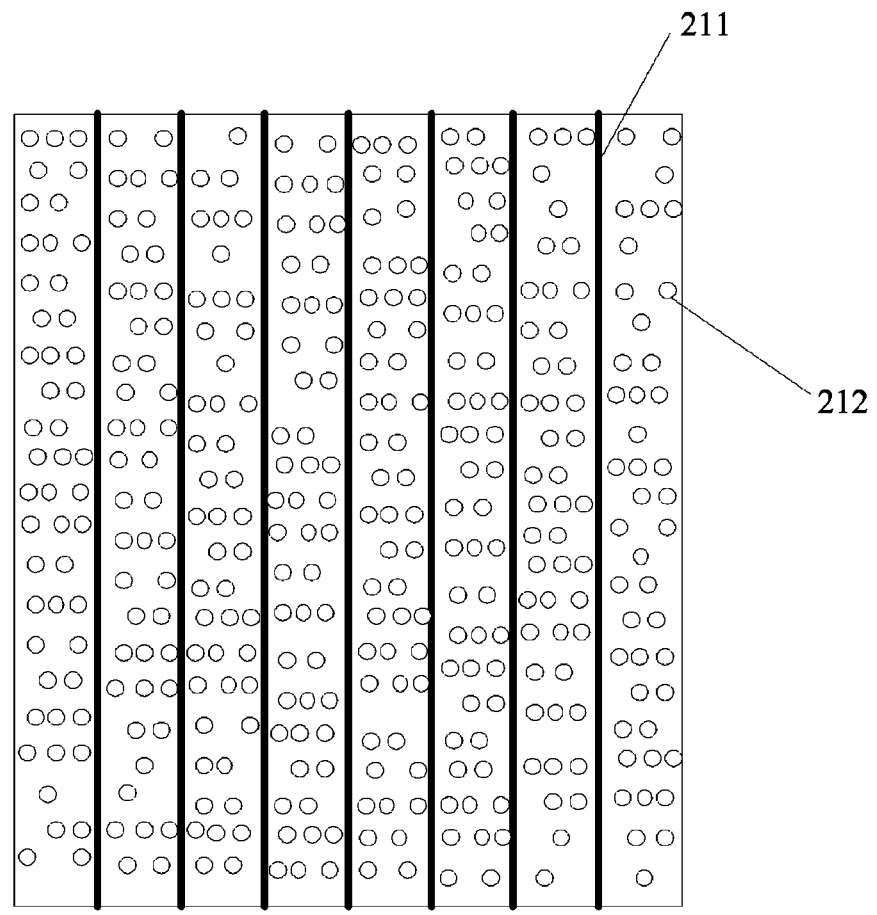
FIG. 2 illustrates a schematic diagram of distribution of light stripes and light spots formed in a reference image according to an embodiment of the disclosure.

For ease of understanding, reference is made to FIG. 2 which illustrates a schematic diagram of the structured light formed in the reference image after the stripe structured light and the dot structured light are projected by the light projector. The reference image includes multiple light stripes 211, and there has no phenomena that the light stripe is distorted, the light stripe is divided into multiple segments or different portion of the light strip is shifted. Multiple light spots 212 are distributed between two light stripes, and the light spots are not distorted.

Step 104 is calculating a first depth value at each light stripe in the target image based on feature information of the light stripes in the reference image and feature information of the light stripes in the target image.

The feature information of the light stripes includes at least the position of each light stripe in the image. The feature information may further include information such as the position relationship of the light stripe with other light stripe.

The depth value at each light stripe in the target image is determined by comparing the feature information of the light stripe in the target image with the feature information of the light stripe in the reference image. For distinction, the depth value at the light stripe in the target image is referred to as a first depth value in the embodiment of the disclosure.

Step 105 is calculating a second depth value at each light spot in the target image based on feature information of the light spots in the reference image and feature information of the light spots in the target image.

The feature information of the light spots includes at least position information of the light spots in the image. The feature information may further include position relationship between the light spot and the light stripe, such as which two light stripes the light spot locate between, and the position relationship between the light spot and the two light stripes.

For any light spot in the target image, the depth value at the light spot in the target image may be determined by comparing feature information of the light spot with feature information of a corresponding light spot in the reference image. For distinction, the depth value at the light spot in the target image is referred to as a second depth value.

Step 106 is generating a depth image of the target image based on the first depth value at the light stripe and the second depth value at the light spot in the target image.

Different from the conventional method, the depth image of the target image is generated based on the first depth value at the light stripe and the second depth value at the light spot in the target image in the embodiment of the disclosure.

In practice, in order to ensure that the bright stripes presented on the object to be captured do not interfere with each other when projecting the stripe structured light onto the object to be captured, the line stripes are designed to be sparse, that is, the gap between the lines is not less than a specified value. However, the gap between the light spots on the object to be captured may be increased relatively. For example, in order to ensure that the bright stripes do not interfere with each other, there may be only 100 light stripes in one row of the image within the same angular field of view, but 640 light spots are distributed in one row of the image. For example, there are 7 light stripes in one row, but there are more than 10 light spots in one row, as shown in FIG. 2.

If only the first depth value at each light stripe in the target image is calculated based on the feature information of the light stripe and the depth image of the target image is generated only based on the first depth value, the resolution of the generated depth image may be low. In the embodiment, by projecting light stripes and light spots between the light stripes on the surface of the object to be captured, multiple light spots are distributed between the light stripes in the target image. Therefore, the depth values at the light stripes and the depth values at the light spots in the target image may be calculated. In this way, the resolution of the depth image generated based on the depth values at the light stripes and the depth values at the light spots in the target image can be improved.

It may be understood that, in generating the depth image of the target image based on the first depth values at the light stripes and the second depth values at the light spots in the target image, more depth values at positions in the target image may be obtained by performing interpolation operation on the first depth values at the light stripes and the second depth values at the light spots in the target image, and the depth image of the target image may be generated based on the depth value at each position.

It should be noted that, sequence of step 104 and step 105 in the embodiment of the disclosure is not limited to the sequence shown in FIG. 1. In practice, step 104 may be performed after step 105. Alternatively, step 104 and step 105 may be performed simultaneously.

In the embodiment of the disclosure, in performing the depth analysis, multiple light stripes and light spots between the light stripes are projected onto a surface of an object to be captured by a light projector, and a target image of the object to be captured including the multiple light stripes and the light spots is then captured, so that the target image includes more information about the structured light, which increases the number of positions in the target image for calculating the depth value. After the target image is obtained, a first depth value at each light stripe in the target image and a second depth value at each light spot in the target image are calculated in conjunction with feature information of the light stripes and the light spots in the reference image, and a depth image of the target image is generated based on the obtained first depth values and second depth values. Compared with the conventional method that the depth image is generated based on light stripes in the image, multiple light spots are inserted between the light stripes and both the depth value at the light stripe in the target image and the depth value at the light spot between the light stripes in the target image are used to generate the depth image, therefore, the generated depth image has higher resolution.

In addition, in another conventional method, depth analysis of the image is performed based on dot structured light, that is, light spots are projected onto a surface of an object to be captured, an image of the object to be captured including the light spots is captured, and a depth image of the image is obtained based on feature information of the light spots in the image. Compared with the conventional method, part of light spots are replaced with light stripes in the embodiment of the disclosure, therefore, the depth values at the light spots needed to be calculated and thus the calculation amount are greatly decreased, while the real-time requirement can also be met.

In the embodiment of the disclosure, in calculating the first depth value at any light stripe in the target image, a parallax between the light stripe in the target image and a light stripe in the reference image corresponding to the light strip in the target image may be calculated based on feature information of the light stripe in the target image and feature information of the corresponding light stripe in the reference image, and then the first depth value at the light stripe in the target image may be determined based on the parallax between the two light stripes. The parallax refers to a direction difference in apparent position of an object viewed from two points with a certain distance from each other. The parallax between the two points refers to the angle of inclination between two lines of sight from the target to the two points. The distance between the two points is called as a base line. The distance between the target and a viewer may be calculated as long as the angle of the parallax and the length of the base line are obtained.

Since some light stripes in the target image may be distorted, for example, some light stripes are divided into multiple segments and some light stripes are shifted, the position of each light stripe in the target image needs to be determined and segments of the same light stripe need to be connected before calculating the light stripes in the target image. The detailed implementation thereof is similar to the conventional method, which is not described herein.

Similarly, in calculating the second depth value at any light spot in the target image, the parallax between the light spot in the target image and a corresponding light spot in the reference image may be calculated based on feature information of the two light spots, and the second depth value at the light spot in the target image may be determined based on the parallax.

Figure 3:
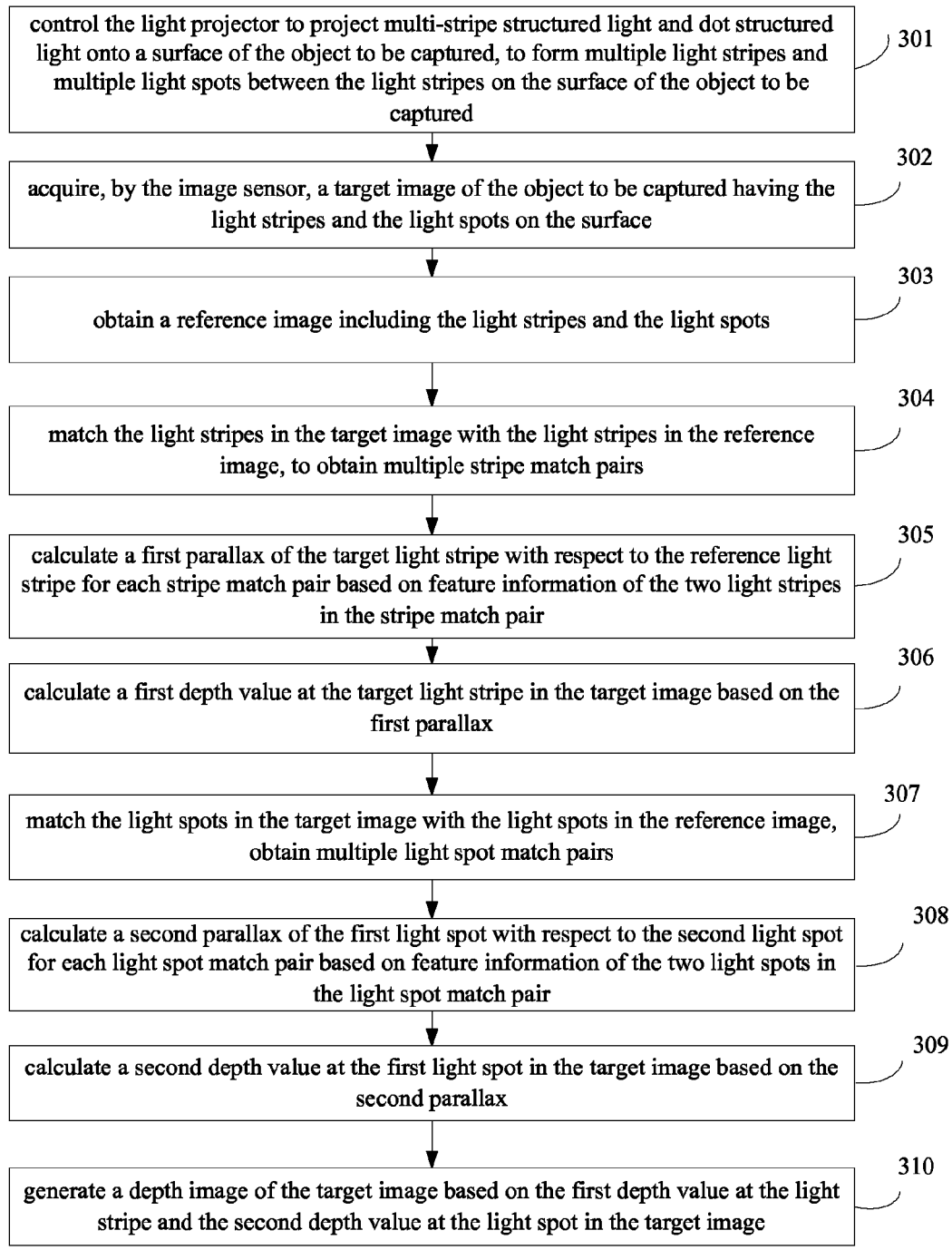
FIG. 3 illustrates a schematic flow chart of an image processing method according to an embodiment of the disclosure.

Reference is made to FIG. 3 which illustrates a schematic flow chart of an information processing method according to another embodiment of the disclosure. The information processing method of the embodiment is applied to an electronic device, and the electronic device includes at least an image sensor and a light projector. For example, the electronic device may be a depth camera based on structured light or other electronic device having a camera and a structured light transmitter. The information processing method of the embodiment includes the following steps 301-310.

Step 301 is controlling the light projector to project multi-stripe structured light and dot structured light onto a surface of an object to be captured, to form multiple light stripes and multiple light spots between the light stripes on the surface of the object to be captured.

Step 302 is acquiring, by the image sensor, a target image of the object to be captured having the light stripes and the light spots on the surface.

Step 303 is obtaining a reference image including the light stripes and the light spots.

The operation processes of step 301 to step 303 may refer to the related description in the above embodiment, which is not described herein.

Step 304 is matching the light stripes in the target image with the light stripes in the reference image, to obtain multiple stripe match pairs.

Each of the stripe match pairs includes a target light stripe in the target image and a reference light stripe in the reference image.

Light stripe matching is performed for determining the correspondence between each light stripe in the target image and each light stripe in the reference image. Two light stripes in a stripe match pair are a light stripe in the target image and a light stripe in the reference image having matching relationship.

For distinction, the light stripe of the target image in the stripe match pair is referred to as a target light stripe, and the light stripe of the reference image in the stripe match pair is referred to as a reference light stripe.

The method for matching the light stripe in the target image with the light stripe in the reference image may be any existing method for matching the light stripes.

Alternatively, the light stripes in the target image may be numbered in order, while the light stripes in the reference image are numbered in order. For example, the light stripes may be numbered from left to right. The light stripe match pairs may be determined by the number of each light stripe in the target image and the number of each light stripe in the reference image.

If there is a light stripe in the target image that is distorted, the light stripe that is divided into multiple segments may be connected. Error may occur during the connection, for example, light stripe segments from different light stripes may be connected together, in this case, the light stripes connected in error may be corrected based on numbers of the light stripes of the object image after the light stripes are numbered, so that the light stripe segments with the same number are connected together. For example, it is assumed that the light stripes in the target image are numbered in order from left to right, both the upper part and the low part of the light stripe are numbered, and the fourth light stripe from left to right is segmented. In this case, after it is determined that the upper part of the segmented light stripe is the fourth light stripe, the lower part of the fourth light stripe may be found from left to right, so that the light stripes need to be connected can be determined accurately.

Step 305 is calculating a first parallax of the target light stripe with respect to the reference light stripe for each stripe match pair based on feature information of the target light stripe and the reference light stripe in the stripe match pair.

The feature information includes at least the position of the light stripe. The parallax of the target light stripe with respect to the reference light stripe is calculated based on the position of the target stripe in the target image and the position of the reference stripe in the reference image in the stripe match pair.

For distinction, the parallax of the target light stripe with respect to the reference light stripe is referred to as a first parallax.

After the stripe match pairs of the target image and the reference image are determined, the method for calculating the first parallax of the target light stripe with respect to the reference light stripe in the stripe match pair may be any existing method for calculating parallax, which is not limited herein.

Step 306 is calculating a first depth value at the target light stripe in the target image based on the first parallax.

A method for calculating the depth value at the target light stripe in the target image based on the parallax of the target light stripe with respect to the reference light stripe may be similar to the existing method.

Step 307 is matching the light spots in the target image with the light spots in the reference image, to obtain multiple light spot match pairs.

Each of the light spot match pairs includes two light spots, which are a first light spot in the target image and a second light spot in the reference image respectively. Light spots in the target image may be matched with light spots in the reference image by image matching technique, to obtain multiple light spot match pairs. For distinction, the light spot of the target image in the light spot match pair is referred to as a first light spot, and the light spot of the reference image in the light spot match pair is referred to as a second light spot.

It should be understood that, since light spots have basically the same shape, the light spot in the target image may be matched with the light spot in the reference image based on the arrangement of the light spot and ambient light spots. Therefore, in order to determine the light spot match pairs of the target image and the reference image, the following conditions need to be met for the light spots projected by the light projector.

The distribution of the projected light spots is not repeated within a specified area, so that the distribution of the light spots of the reference image within the specified range is not repeated, and the distribution of the light spots of the target image within the specified range is not repeated, therefore, the distribution relationship between each of the light spots and other light spots within the specified range is difference. For example, the size of the matching window may be set to 3*3 in which the light spots may be randomly distributed, but the distributions of the light spots within any two of 9*9 windows are not repeated.

Step 308 is calculating a second parallax of the first light spot with respect to the second light spot for each light spot match pair based on feature information of the two light spots in the light spot match pair.

Step 309 is calculating a second depth value at the first light spot in the target image based on the second parallax.

For distinction, the parallax of the first light spot with respect to the second light spot in the reference image is referred to as a second parallax.

The method for calculating the parallax of the first light spot with respect to the second light spot in the light spot match pair may be any existing method for calculating the parallax, which is not limited herein. Accordingly, the method for calculating the second depth value at the first light spot in the target image based on the parallax of the first light spot with respect to the second light spot may be any existing method for calculating the depth value based on the parallax.

Step 310 is generating a depth image of the target image based on the first depth value at the light stripe and the second depth value at the light spot in the target image.

The process of generating the depth image may refer to the related description in the above embodiments, which is not described herein.

Alternatively, in the embodiment of the disclosure, the step of matching the light spots in the target image with the light spots in the reference image may include the following.

For a first target light stripe and a second target light stripe which are any two adjacent target light stripes in the target image, a first reference light stripe and a second reference light stripe in the reference image respectively matching with the first target light stripe and the second target light stripe may be determined. However, the stripe match pairs may be determined directly if step 304 is performed, therefore, the first reference light stripe and the second reference light stripe in the reference image respectively matching with the first target light stripe and the second target light stripe may be determined.

Further, the target light spot between the first target light stripe and the second target light stripe in the target image may be matched with a reference light spot from light spots between the first reference light stripe and the second reference light stripe in the reference image, to obtain a light spot matching pair.

That is, in performing the light spot matching, a light spot between any two adjacent target light stripes in the target image may be match with a light spot between any two adjacent reference light stripes in the reference image matching with the two adjacent target light stripes. For example, referring to FIG. 2, it is assumed that the first light stripe and the second light stripe from left to right in the target image are matched with the first reference light stripe and the second reference light stripe from left to right in the reference image respectively. Thus, the target light spot between the first target light stripe and the second target light stripe may be matched with a light spot between the first reference light stripe and the second reference light stripe, to obtain a reference light spot matching with the target light spot.

It should be understood that, in matching the light spot in the target image with the light spot in the reference image, if the matching calculation on each light spot in the reference image is performed sequentially each time a light spot in the target image is matched, the data calculation amount is large. Accordingly, based on the corresponding relationship between the light stripes, light spots between two adjacent light stripes in the target image are matched with the light spots between two corresponding light stripes in the reference image sequentially, therefore, the matching calculation for all the light spots in the reference image is not needed every time the match is performed, thus the matching calculation amount is greatly reduced, and the real-time requirement is ensured.

Alternatively, in any of the above embodiments, the first depth value at each light stripe in the target image may be calculated as follows: after each light stripe in the target image is located, determining a stripe center position of each light stripe, and calculating the first depth value at the stripe center of each light stripe in the target image. For example, referring to FIG. 2, each light stripe is arranged vertically, and each light stripe has a certain horizontal width. In order to calculate accurately, a center point in the horizontal width along the vertical direction may be determined, to obtain a center position of each light stripe along the vertical direction, and then the depth value at the center position of the stripe is calculated.

Figure 4:
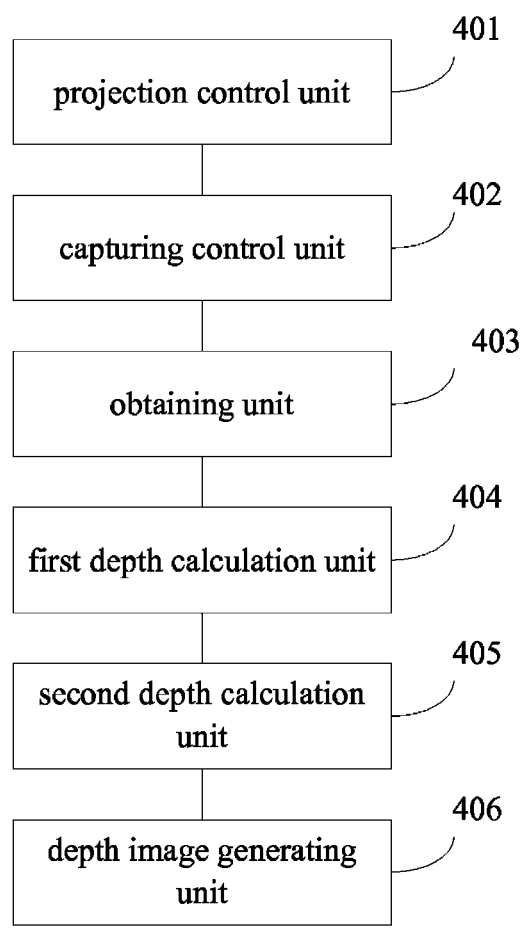
FIG. 4 illustrates a schematic structural diagram of an image processing device according to an embodiment of the disclosure.

Corresponding to the image processing method of the disclosure, an image processing device is further provided. Reference is made to FIG. 4 which illustrates a schematic structural diagram of an image processing device according to an embodiment of the disclosure. The device in this embodiment is applied to an electronic device, and the electronic device includes at least an image sensor and a light projector. The device includes:

a projection control unit 401 configured to control the light projector to project multi-stripe structured light and dot structured light onto a surface of an object to be captured, to form multiple light stripes and multiple light spots between the light stripes on the surface of the object to be captured;

a capturing control unit 402 configured to acquire, by the image sensor, a target image of the object to be captured having the light stripes and the light spots on the surface;

an obtaining unit 403 configured to obtain a reference image including the light stripes and the light spots;

a first depth calculation unit 404 configured to calculate a first depth value at each light stripe in the target image based on feature information of the light stripes in the reference image and feature information of the light stripes in the target image;

a second depth calculation unit 405 configured to calculate a second depth value at each light spot in the target image based on feature information of the light spots in the reference image and feature information of the light spots in the target image; and a depth image generating unit 406 configured to generate a depth image of the target image based on the first depth value at the light stripe and the second depth value at the light spot in the target image.

Preferably, the first depth calculation unit includes:

a center depth calculation unit configured to calculate the first depth value at a stripe center of each light stripe in the target image based on feature information of the light stripes in the reference image and feature information of the light stripes in the target image.

Based on a way to calculate the depth, the first depth calculation unit may include:

a first matching unit configured to match the light stripes in the target image with the light stripes in the reference image, to obtain multiple stripe match pairs, wherein each of the stripe match pairs includes a target light stripe in the target image and a reference light stripe in the reference image;

a first parallax calculation unit configured to calculate a first parallax of the target light stripe with respect to the reference light stripe for each stripe match pair based on feature information of the target light stripe and the reference light stripe in the stripe match pair; and a first depth calculation subunit configured to calculate the first depth value at the target light stripe in the target image based on the first parallax.

Correspondingly, the second depth calculation unit may include:

a second matching unit configured to match the light spots in the target image with the light spots in the reference image, to obtain multiple light spot match pairs, wherein each of the light spot match pairs includes a first light spot in the target image and a second light spot in the reference image;

a second parallax calculation unit configured to calculate a second parallax of the first light spot with respect to the second light spot for each light spot match pair based on feature information of the first light spot and the second light spot in the light spot match pair; and a second depth calculation subunit configured to calculate a second depth value at the first light spot in the target image based on the second parallax.

Preferably, the second matching unit includes:

a stripe match determining unit configured to determine, in the reference image, a first reference light stripe and a second reference light stripe respectively matching with a first target light stripe and a second target light stripe which are any two adjacent target light stripes in the target image; and a second matching subunit configured to match a target light spot between the first target light stripe and the second target light stripe in the target image with a reference light spot from light spots between the first reference light stripe and the second reference light stripe in the reference target, to obtain the light spot match pair.

The embodiments of the disclosure are described herein in a progressive manner, with the emphasis of each of the embodiments on the difference between it and the other embodiments; hence, for the same or similar parts between the embodiments, one can refer to the other embodiments. For the device disclosed in the embodiments, the description thereof is simple since they correspond to the methods disclosed in the embodiments, hence, the related parts can refer to the description of the method parts.

Those skilled in the art can implement or use the disclosure by the above description of the embodiments herein. Various modifications to these embodiments will be apparent to those skilled in the art, and the general principle defined herein can be implemented in other embodiments without deviation from the spirit or scope of the disclosure. Therefore, the disclosure will not be limited to these embodiments described herein, but in accordance with the widest scope consistent with the principle and novel features disclosed herein.

The invention claimed is:

1. An image processing method, which is applied to an electronic device, the electronic device comprising at least an image sensor and a light projector, wherein the method comprises:

controlling the light projector to project multi-stripe structured light and dot structured light onto a surface of an object to be captured, to form a plurality of light stripes and a plurality of light spots between the light stripes on the surface of the object to be captured;

acquiring, by the image sensor, a target image of the object to be captured having the light stripes and the light spots on the surface;

obtaining a reference image comprising the light stripes and the light spots;

calculating a first depth value at each of the light stripes in the target image based on feature information of the light stripes in the reference image and feature information of the light stripes in the target image;

calculating a second depth value at each of the light spots in the target image based on feature information of the light spots in the reference image and feature information of the light spots in the target image; and generating a depth image of the target image based on the first depth value at the light stripe and the second depth value at the light spot in the target image.

2. The method according to claim 1, wherein the calculating a first depth value at each of the light stripes in the target image comprises:

calculating the first depth value at a stripe center of each of the light stripes in the target image.

3. The method according to claim 1, wherein the calculating a first depth value at each of the light stripes in the target image based on feature information of the light stripes in the reference image and feature information of the light stripes in the target image comprises:

matching the light stripes in the target image with the light stripes in the reference image, to obtain a plurality of stripe match pairs, wherein each of the stripe match pairs comprises a target light stripe in the target image and a reference light stripe in the reference image;

calculating a first parallax of the target light stripe with respect to the reference light stripe for each of the stripe match pairs based on feature information of the target light stripe and the reference light stripe in the stripe match pair; and calculating the first depth value at the target light stripe in the target image based on the first parallax.

4. The method according to claim 1, wherein the calculating a second depth value at each of the light spots in the target image based on feature information of the light spots in the reference image and feature information of the light spots in the target image comprises:

matching the light spots in the target image with the light spots in the reference image, to obtain a plurality of light spot match pairs, wherein each of the light spot match pairs comprises a first light spot in the target image and a second light spot in the reference image;

calculating a second parallax of the first light spot with respect to the second light spot for each of the light spot match pairs based on feature information of the first light spot and the second light spot in the light spot match pair; and calculating the second depth value at the first light spot in the target image based on the second parallax.

5. The method according to claim 3, wherein the calculating a second depth value at each of the light spots in the target image based on feature information of the light spots in the reference image and feature information of the light spots in the target image comprises:

matching the light spots in the target image with the light spots in the reference image, to obtain a plurality of light spot match pairs, wherein each of the light spot match pairs comprises a first light spot in the target image and a second light spot in the reference image;

calculating a second parallax of the first light spot with respect to the second light spot for each of the light spot match pairs based on feature information of the first light spot and the second light spot in the light spot match pair; and calculating the second depth value at the first light spot in the target image based on the second parallax.

6. The method according to claim 4, wherein the matching the light spots in the target image with the light spots in the reference image comprises:

determining, in the reference image, a first reference light stripe and a second reference light stripe respectively matching with a first target light stripe and a second target light stripe which are any two adjacent target light stripes in the target image; and matching a target light spot between the first target light stripe and the second target light stripe in the target image with a reference light spot from light spots between the first reference light stripe and the second reference light stripe in the reference image, to obtain the light spot match pair.

7. The method according to claim 5, wherein the matching the light spots in the target image with the light spots in the reference image comprises:

determining, in the reference image, a first reference light stripe and a second reference light stripe respectively matching with a first target light stripe and a second target light stripe which are any two adjacent target light stripes in the target image; and matching a target light spot between the first target light stripe and the second target light stripe in the target image with a reference light spot from light spots between the first reference light stripe and the second reference light stripe in the reference image, to obtain the light spot match pair.

8. An image processing device, which is applied to an electronic device, the electronic device comprising at least an image sensor and a light projector, wherein the device comprises:

a processor, configured to control the light projector to project multi-stripe structured light and dot structured light onto a surface of an object to be captured, to form a plurality of light stripes and a plurality of light spots between the light stripes on the surface of the object to be captured;

the image sensor, configured to acquire a target image of the object to be captured having the light stripes and the light spots on the surface, wherein the processor is further configured to:

obtain a reference image comprising the light stripes and the light spots;

calculate a first depth value at each of the light stripes in the target image based on feature information of the light stripes in the reference image and feature information of the light stripes in the target image;

calculate a second depth value at each of the light spots in the target image based on feature information of the light spots in the reference image and feature information of the light spots in the target image; and generate a depth image of the target image based on the first depth value at the light stripe and the second depth value at the light spot in the target image.

9. The device according to claim 8, wherein the processor is further configured to:

calculate the first depth value at a stripe center of each of the light stripes in the target image based on the feature information of the light stripes in the reference image and the feature information of the light stripes in the target image.

10. The device according to claim 8, wherein the processor is further configured to:

match the light stripes in the target image with the light stripes in the reference image, to obtain a plurality of stripe match pairs, wherein each of the stripe match pairs comprises a target light stripe in the target image and a reference light stripe in the reference image;

calculate a first parallax of the target light stripe with respect to the reference light stripe for each of the stripe match pairs based on feature information of the target light stripe and the reference light stripe in the stripe match pair; and calculate the first depth value at the target light stripe in the target image based on the first parallax.

11. The device according to claim 8, wherein the processor is further configured to:

match the light spots in the target image with the light spots in the reference image, to obtain a plurality of light spot match pairs, wherein each of the light spot match pairs comprises a first light spot in the target image and a second light spot in the reference image;

calculate a second parallax of the first light spot with respect to the second light spot for each of the light spot match pairs based on feature information of the first light spot and the second light spot in the light spot match pair; and calculate the second depth value at the first light spot in the target image based on the second parallax.

12. The device according to claim 10, wherein the processor is further configured to:

match the light spots in the target image with the light spots in the reference image, to obtain a plurality of light spot match pairs, wherein each of the light spot match pairs comprises a first light spot in the target image and a second light spot in the reference image;

calculate a second parallax of the first light spot with respect to the second light spot for each of the light spot match pairs based on feature information of the first light spot and the second light spot in the light spot match pair; and calculate the second depth value at the first light spot in the target image based on the second parallax.

13. The device according to claim 11, wherein the processor is further configured to:

determine, in the reference image, a first reference light stripe and a second reference light stripe respectively matching with a first target light stripe and a second target light stripe which are any two adjacent target light stripes in the target image; and match a target light spot between the first target light stripe and the second target light stripe in the target image with a reference light spot from light spots between the first reference light stripe and the second reference light stripe in the reference image, to obtain the light spot match pair.

14. The device according to claim 12, wherein the processor is further configured to:

determine, in the reference image, a first reference light stripe and a second reference light stripe respectively matching with a first target light stripe and a second target light stripe which are any two adjacent target light stripes in the target image; and match a target light spot between the first target light stripe and the second target light stripe in the target image with a reference light spot from light spots between the first reference light stripe and the second reference light stripe in the reference image, to obtain the light spot match pair.

* * * * *